United States Patent
Takahashi et al.

(10) Patent No.: US 7,824,107 B2
(45) Date of Patent: Nov. 2, 2010

(54) HUB UNIT

(75) Inventors: Akira Takahashi, Kanagawa (JP); Youichi Oku, Kanagawa (JP)

(73) Assignee: NSK Ltd., Tokyo (JP)

( * ) Notice: Subject to any disclaimer, the term of this patent is extended or adjusted under 35 U.S.C. 154(b) by 668 days.

(21) Appl. No.: 11/348,270

(22) Filed: Feb. 7, 2006

(65) Prior Publication Data
US 2006/0177169 A1   Aug. 10, 2006

(30) Foreign Application Priority Data
Feb. 8, 2005 (JP) ............ P. 2005-032145
Aug. 31, 2005 (JP) ............ P. 2005-251879

(51) Int. Cl.
*F16C 13/00* (2006.01)
*B60B 27/00* (2006.01)
(52) U.S. Cl. .................... 384/544; 301/105.1
(58) Field of Classification Search .......... 384/544; 301/35.627, 95.101, 105.1
See application file for complete search history.

(56) References Cited

U.S. PATENT DOCUMENTS

| | | | | |
|---|---|---|---|---|
| 2,956,632 A | * | 10/1960 | Forbush et al. | ............ 180/385 |
| 5,975,647 A | * | 11/1999 | Pons et al. | ............ 301/108.1 |
| 2002/0168539 A1 | * | 11/2002 | Jonte et al. | ............ 428/633 |
| 2003/0062764 A1 | * | 4/2003 | Vignotto et al. | ............ 301/105.1 |
| 2006/0005390 A1 | * | 1/2006 | Wang | ............ 29/894.36 |

FOREIGN PATENT DOCUMENTS

| | | |
|---|---|---|
| JP | 35-15302 Y | 7/1960 |
| JP | 2-95901 A | 4/1990 |
| JP | 5-16565 A | 1/1993 |
| JP | 9-15256 A | 1/1997 |
| JP | 2004-52917 A | 2/2004 |
| WO | 2005/059386 A1 | 6/2005 |

OTHER PUBLICATIONS

Notice of Reasons for Rejection issued Jun. 16, 2010 in counterpart Japanese Application No. 2005-251879.

* cited by examiner

*Primary Examiner*—Thomas R Hannon
*Assistant Examiner*—James Pilkington
(74) *Attorney, Agent, or Firm*—Sughrue Mion, PLLC

(57) ABSTRACT

A hub unit includes a double-row outer ring having a first inner peripheral raceway and a second inner peripheral raceway, a hub having a wheel-mounting flange provided with a reference surface for mounting the wheel formed on a vehicle outer end-side thereof, a first outer peripheral raceway opposed to the first inner peripheral raceway of the outer ring, a shaft body and an inner ring element having a second outer peripheral raceway opposed to the second inner peripheral raceway of the outer ring, rolling members interposed between the double-row inner peripheral raceway of the outer ring and the double-row outer peripheral raceway of the hub and cages. A rust-preventive layer is provided at least on the wheel-mounting reference surface of the flange.

5 Claims, 5 Drawing Sheets

HUB UNIT

The present invention claims foreign priority to Japanese patent application No. P.2005-32145, filed on Feb. 8, 2005 and P.2005-251879, filed on Aug. 31, 2005, the contents of which is incorporated herein by reference.

BACKGROUND OF THE INVENTION

1. Field of the Invention

This invention relates to a hub unit (wheel-supporting rolling bearing unit) for supporting a wheel of an automobile or the like and a brake rotary member (for example, a brake rotor or a brake drum) rotating with this wheel.

2. Description of the Background Art

As a hub unit of this kind, there is known one including a hub ring 10, an inner ring 20, an outer ring 30, and a plurality of rolling members 40 as shown in FIG. 5.

A pilot portion 110 and a wheel-mounting flange 120 are provided at an outboard side (which is an outer end portion in a direction of a width of an automobile in a condition in which the hub unit is mounted on the automobile, and means a left end portion in FIG. 5) of the hub ring 10. A wheel and a brake rotor (brake rotary member) which are not shown are fixed to an axially outward side surface of this wheel-mounting flange 120 through bolts 60.

On the other hand, a smaller-diameter step portion 130 is formed at an inboard side (which is an inner end portion in the direction of the width of the automobile in the condition in which the hub unit is mounted on the automobile, and means a right end portion in FIG. 5) of the hub ring 10. The inner ring 20 is fitted on this smaller-diameter step portion 130. Inner raceway surfaces 10a and 20a are formed on an outer peripheral surface of an axially intermediate portion of the hub ring 10 and an outer peripheral surface of the inner ring 20, respectively.

An inboard-side distal end portion of the hub ring 10 is formed into a cylindrical tubular shape, and by caulkingly spreading this cylindrical tubular portion (caulking portion) radially outwardly, the inner ring 20, fitted on the smaller-diameter step portion 130 of the hub ring 10, is fixed in a predetermined position. In some cases, instead of the caulking, a necessary preload is applied to the inner ring 20 by fastening a nut.

A plurality of rows of outer raceway surfaces 30a and 30b, corresponding respectively to the inner raceway surfaces 10a and 20a of the hub ring 10 and inner ring 20, are formed on an inner peripheral surface of the outer ring 30. A suspension-mounting flange 310 is provided at that end portion of this outer ring 30 remote from the wheel-mounting flange 120 of the hub ring 10.

The plurality of rolling members 40 are rollably mounted between each of the inner raceway surfaces 10a and 20a, formed respectively on the hub ring 10 and the inner ring 20, and a respective one of the outer raceway surfaces 30a and 30b, formed on the outer ring 30, through a cage 50.

In FIG. 5, although an explanation has been made of the case where balls are used as the rolling members 40, tapered rollers are used as the rolling members 40 in some cases where the hub unit has a heavy weight.

For mounting the hub unit on the automobile, the suspension-mounting flange 310 of the outer ring 30 (which is the non-rotation side) is fixed to a suspension device (not shown), and the brake rotor and the wheel (which are not shown) are fixed to the wheel-mounting flange 120 of the hub ring 10 (which is the rotation side) through the hub bolts 60. As a result, the wheel can be rotatably supported on the suspension device.

Further, run-out P of a reference surface $2f_1z$ of a flange $2fz$ relative to a rotation center Xo-Xo of a hub unit Huz is required in the market to be highly precise at the time of shipment so that a brake shudder problem will not arise.

However, muddy water is splashed on the hub unit Huz during the travel of the vehicle, and thus an environment in which this hub unit is used is severe. Therefore, when the reference surface $2f_1z$ of the flange $2fz$, made of carbon steel, is exposed to muddy water, rust can develop on this reference surface. In this case, there is a fear that the initial run-out P can not be kept highly precisely, so that the brake shudder problem arises.

There is a proposal for solving the problem with the rust of the hub unit in Japanese Patent Unexamined Publication No. JP-A-9-15256.

In the JP-A-9-15256, however, a thermosetting resin is coated on an outer peripheral surface of an outer ring of a hub unit, and a coating is formed so as to prevent rust from developing on a serrated portion forming a pulsar ring, and this is not designed to maintain the precision of flange run-out by preventing rust from developing on a wheel-mounting flange.

On the other hand, as means for suppressing the developing of run-out, there is given means for cutting the side surface of the wheel-supporting flange 120 after fastening the hub bolts 60. Although this means can suppress the generation of vibration, there is encountered a problem that fretting and rust develop on the side surface of the wheel-supporting flange 120.

SUMMARY OF THE INVENTION

This invention has been made in view of these points, and an object of this invention is to provide a hub unit in which fretting and rust are less liable to develop, and a wheel-mounting reference surface will not be corroded by muddy water so as to keep run-out precision of the reference surface to its initial run-out precision, thereby preventing a vibration problem and a brake shudder problem from arising.

According to a first aspect of the present invention, there is provided a hub unit comprising:

a double-row outer ring comprising:

a first inner peripheral raceway at a vehicle outer end-side portion; and a second inner peripheral raceway at a vehicle center-side portion;

a hub comprising:

a wheel-mounting flange provided at a vehicle outer end-side portion, the wheel-mounting flange being provided with a reference surface for mounting the wheel formed on a vehicle outer end-side thereof;

a first outer peripheral raceway formed integrally with or separately from the hub at a vehicle center-side of the flange, the first outer peripheral raceway being opposed to the first inner peripheral raceway of the outer ring;

a shaft body comprising a distal end fitting portion at a vehicle center-side thereof; and an inner ring element which is fitted on and fixed to the distal end fitting portion, and comprises a second outer peripheral raceway opposed to the second inner peripheral raceway of the outer ring;

rolling members interposed between the double-row inner peripheral raceway of the outer ring and the double-row outer peripheral raceway of the hub so as to allow a relative rotation between the outer ring and the hub; and cages holding the rolling members, wherein a rust-preventive layer is provided at least on the wheel-mounting reference surface of the flange.

According to a second aspect of the present invention, as set forth in the first aspect of the present invention, it is preferable that two or more rust-preventive layers are provided.

According to a third aspect of the present invention, as set forth in the second aspect of the present invention, it is preferable that two rust-preventive layers are provided, and hardness of the vehicle center-side rust-preventive layer is higher than hardness of the vehicle outer end-side rust-preventive layer.

In the present invention, there can be provided the hub unit in which the wheel-mounting reference surface will not be corroded by muddy water or the like, and run-out precision of the reference surface can be kept to its initial run-out precision, thereby preventing a brake shudder problem from arising.

In the present invention, fretting and rust are made less liable to develop at least on the axially-outward side surface of the wheel-mounting flange by the lowermost plating layer composed of a hard plating film, and besides side run-out of the wheel-mounting flange is absorbed by the uppermost plating layer composed of a soft plating film, so that the parallelism of the wheel-mounting flange and the wheel or the brake rotary member relative to each other is secured, and therefore vibration is less liable to develop.

DETAILED DESCRIPTION OF THE PREFERRED EMBODIMENTS

Figure 1:
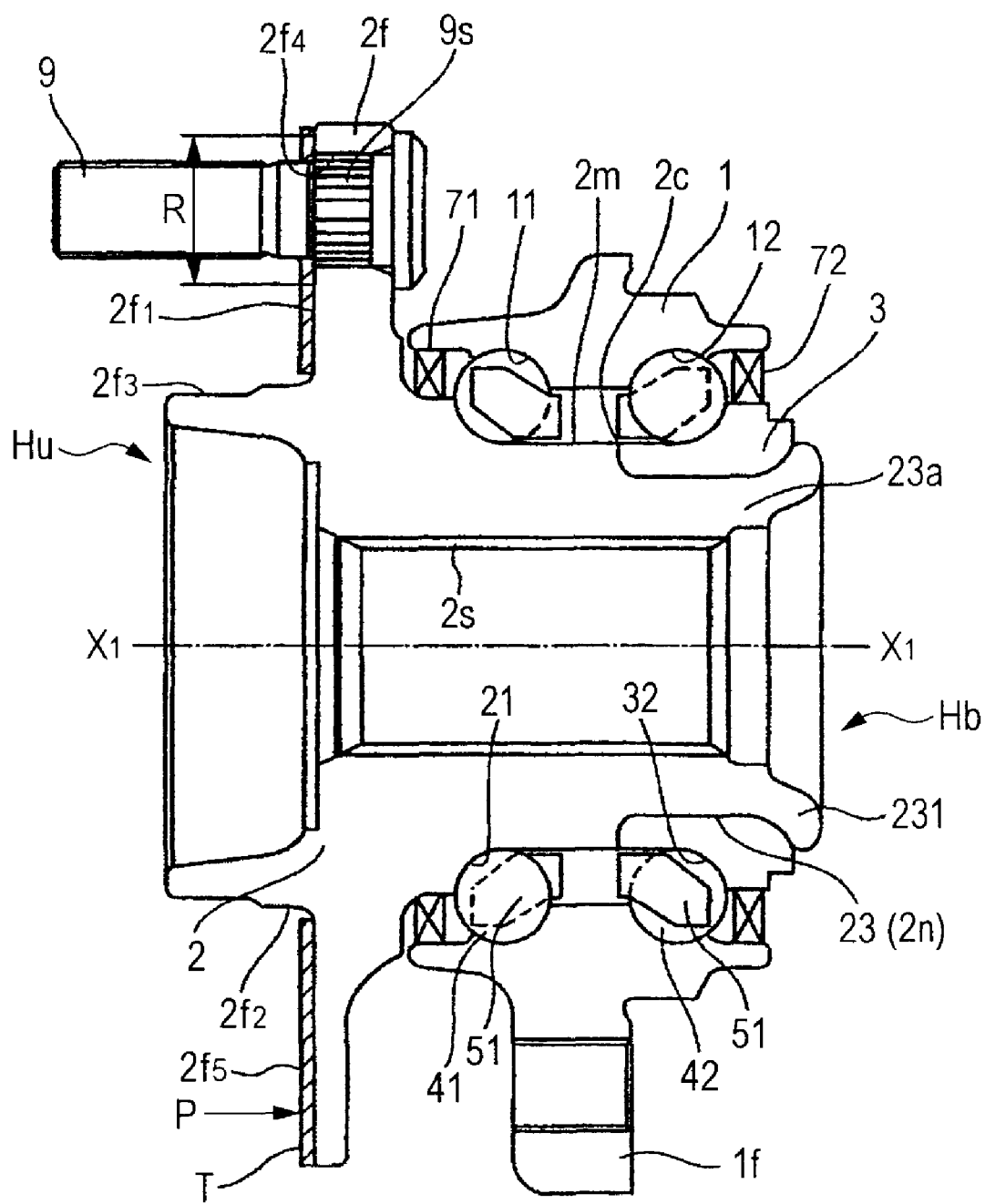
FIG. 1 is a cross-sectional view showing a first embodiment of the present invention.

An embodiment of a hub unit of the present invention will now be described with reference to the drawings.

In the description of the embodiment, for simplicity, a vehicle outer end side will be referred to as "outer end side", and a vehicle center side will be referred to as "center side".

The first embodiment will be described with reference to FIG. 1.

Embodiment

A hub unit Hu includes an outer ring 1 which has a first inner peripheral raceway 11 at an inner periphery of an outer end-side portion thereof and a second inner peripheral raceway 12 at an inner periphery of a center-side portion thereof, a hub Hb which has a wheel-mounting flange 2f at an outer end-side portion thereof, and has a first outer peripheral raceway 21 (at a portion thereof from the flange 2f toward the center side) opposed to the first inner peripheral raceway 11 of the outer ring 1, and further has a distal end portion 23a at a center-side portion thereof, and has a second inner peripheral raceway 32 opposed to the second inner peripheral raceway 12 of the outer ring 1, balls 41 and 42 interposed respectively between the first inner peripheral raceway of the outer ring 1 and the first outer peripheral raceway of the hub Hb and between the second inner peripheral raceway of the outer ring 1 and the second outer peripheral raceway of the hub Hb, and seals 71 and 72 provided respectively at the opposite end portions of the outer ring 1 to form a seal between the outer ring 1 and the hub Hb.

The outer ring 1 has a vehicle body-mounting flange 1f provided at the outer periphery thereof.

The hub Hb comprises a shaft body 2 having the flange 2f (for mounting a wheel or a brake disc which are not shown) at an outer end-side portion thereof and the distal end portion 23a at a center-side portion thereof, and an inner ring element 3 fitted on and fixed to an end fitting portion 23 of the distal end portion 23a of the shaft body 2.

The first outer peripheral raceway 21 is formed integrally on that portion of an outer peripheral surface 2m (formed at a central portion of the shaft body 2 at the region from the wheel-mounting flange 2f toward the center side) of the shaft body 2 disposed close to the flange 2f. Further, a smaller-diameter portion 2n is formed on the outer peripheral surface of the center-side distal end portion 23a via a step portion 2c (stepped relative to the outer peripheral surface 2m of the central portion) to form the end fitting portion 23, and the portion (right portion in FIG. 1) which is closer to the center side than the end fitting portion 23 is formed into a caulking portion 231.

A reference surface $2f_1$ for mounting the wheel or the brake disc (which are not shown), a first pilot portion $2f_2$ and a second pilot portion $2f_3$, slightly smaller in diameter than the first pilot portion $2f_2$, are formed at the outer end side of the flange 2f.

A rust-preventive layer T is provided on the reference surface $2f_1$. The rust-preventive layer T can be provided by a fused ceramics material, a plastics material coated on the reference surface by insert molding of the flange 2f, a separate worked part of a rust-preventive material fixed to the reference surface by an adhesive or the like, a worked part of a rust-preventive metallic material fixed thereto, or others.

Taking the strength into consideration, the rust-preventive layer T can be set to a respective one of predetermined thickness determined by the various rust-preventive materials.

After the rust-preventive layer T is formed, it is necessary to highly precisely maintaining a specification value of run-out P of the reference surface relative to a rotation center $X_1$-$X_1$ of the hub unit Hu.

Bolts 9 for mounting the wheel or the brake disc are mounted on the flange 2f by press-fitting serration (9s) portions, formed on non-threaded portions of the respective bolts 9, into respective bolts holes $2f_4$ formed through a plurality of circumferentially-spaced predetermined portions of an outer peripheral portion of the flange 2f. At this time, the reference surface $2f$, is sometimes deformed toward the outer end side, and the reference surface $2f$, slightly bulges from the reference surface $2f_1$, so that the run-out P exceeds the specification value.

This deformed portion is in the range of a portion R surrounding each bolt 9. Therefore, it is necessary to eliminate the deformation, and in the case where this is done before the formation of the rust-preventive layer T, the reference surface $2f$, of the flange 2f made of carbon steel can be finished by grounding or turning so that the reference surface can fall within the specification value even after the formation of the rust-preventive layer T.

In the case where the deformation due to the press-fitting of the bolts is eliminated after the formation of the rust-preventive layer T, a surface $2f_5$ of the rustless material, forming the rust-preventive layer T, is ground or turned. In this case, the elimination of the deformation and the correction of a precision variation of the rust-preventive layer T itself can both be effected.

By such machining operation, the desired run-out precision of the surface $2f_5$ of the flange 2f on the order of not larger than 10 microns can be secured, and since the reference surface is covered with the rust-preventive material, the high precision can be maintained for a long period of time.

Serrations 2s for mounting a drive shaft (not shown) are formed on an inner peripheral surface of the shaft body 2.

The inner ring element 3 is fitted on the end fitting portion 23 of the shaft body 2, and is held between the step portion 2c and the caulking portion 231 of the shaft body 2 in the axial direction, and is fixed to the shaft body 2. The second outer peripheral raceway 32, opposed to the center-side second inner peripheral raceway 12 of the outer ring 1, is formed at the outer peripheral surface of the inner ring element 3. By coupling the shaft body 2 and the inner ring element 3 to each other, the hub Hb forms the first outer peripheral raceway 21 and second outer peripheral raceway 32 opposed respectively to the first inner peripheral raceway 11 and second inner peripheral raceway 12 of the outer ring 1.

The plurality of rows of balls 41 and 42 are interposed between the outer ring 1 and the hub Hb, and are held by cages 51.

The outer end-side seal 71 and the center-side seal 72 are mounted at the opposite end portions of the outer ring 1, respectively, and form a seal between the outer ring 1 and the hub Hb.

In this embodiment, although the flange 2f is formed integrally with the shaft body 2, the flange 2f may be beforehand worked as a separate member, in which case the rust-preventive layer T is formed on the reference surface $2f_1$, and run-out precision is finished to the specification value, and thereafter this flange is integrally fixed to the shaft body 2. In this case, when the rust-preventive layer T is to be formed, the flange 2f is in a condition of the part, and therefore can be easily handled.

Next, a second embodiment which is a modified example of the first embodiment (This modified example shows a driven ring.) will be described with reference to FIG. 2.

This modified example differs from FIG. 1 in that a rust-preventive layer T made of a rust-preventive material is formed on a reference surface $2f_1$, a first pilot portion $2f_2$ and a second pilot portion $2f_3$ of a flange 2f.

As means for fitting and fixing an inner ring element 3 relative to a shaft body 2 to thereby form a hub Hb, this inner ring element is held between a nut N, threaded on a screw portion 232 formed at a distal end portion 23a of the shaft body 2, and a step portion 2c of the shaft body 2 in an axial direction.

A seal, mounted on a center-side portion of an outer ring 1 is in the form of a lid-like seal 72.

In this modified example, the rust-preventive layer T is formed also on the first pilot portion $2f_2$ and the second pilot portion $2f_3$, and therefore a reference surface in a radial direction of a wheel or a brake disc also will not rust, and initial precision can be maintained.

In this modified example, the rust-preventive layer can be produced as a single part, in which case hole portions for the passage of bolts 9 mounted on the flange 2f are disposed in fitted relation to the respective bolts 9, with interference provided, and are kept in a provisionally-fastened condition, and when mounting the wheel or the brake disc, the rust-preventive layer T and the flange 2f are joined together, with no gap formed therebetween, by forces for tightening the bolts 9. In this case, the rust-preventive layer T can be handled as the part, and therefore the handling can be easily effected.

Explanation of those portions and reference numerals, already explained in FIG. 1, is omitted.

Figure 3:
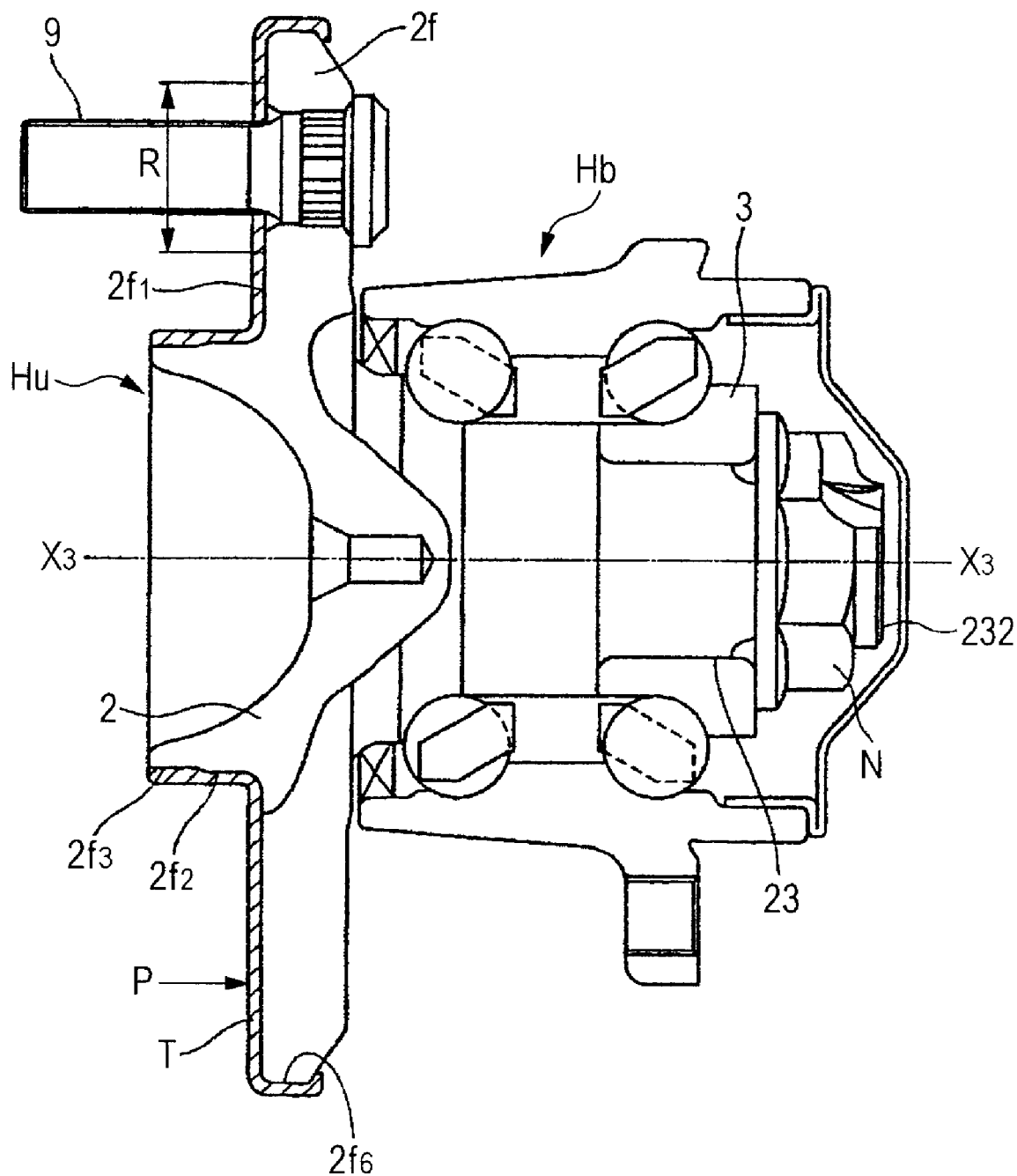
FIG. 3 is a cross-sectional view showing a third embodiment of the present invention.

Next, a third embodiment which is a modified example of the first embodiment will be described with reference to FIG. 3.

Figure 2:
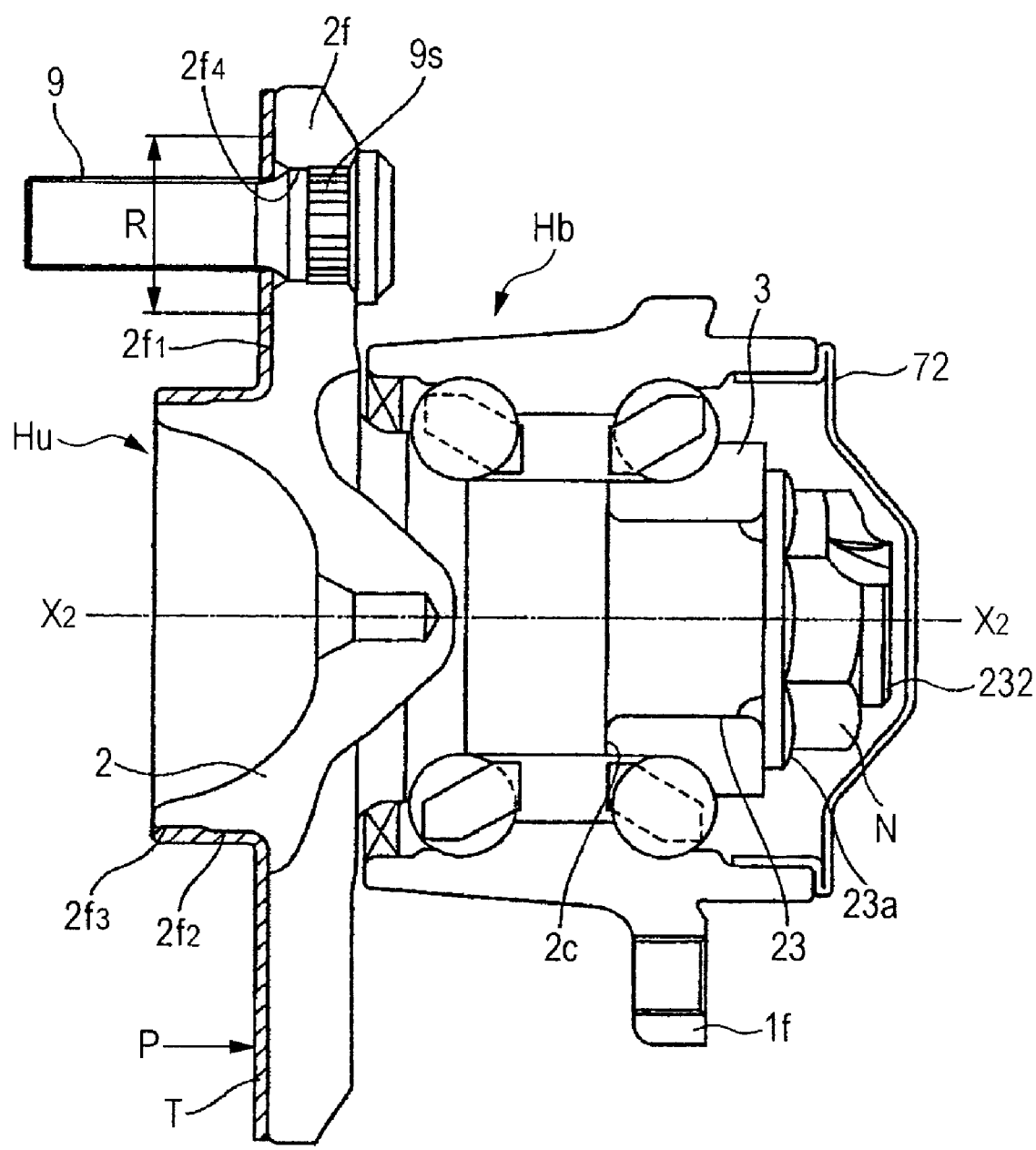
FIG. 2 is a cross-sectional view showing a second embodiment of the present invention.

This modified example differs from FIG. 2 in that a rust-preventive layer T is formed on an outer peripheral portion $2f_6$ of a flange 2f over an entire area thereof.

In this modified example, the whole of the outer peripheral portion $2f_6$ of the flange 2f is covered with a rust-preventive material, and therefore comparing with FIG. 1 in which the reference surface $2f_1$ of the flange 2f is covered with the rust-preventive layer, if a slight gap should exist between the rust-preventive layer and the reference surface $2f_1$ in the case of FIG. 1, there is a fear of penetration of muddy water. However, in this modified example, there is no such fear.

Next, a fourth embodiment of the present invention will be described with reference to the drawings.

Figure 4:
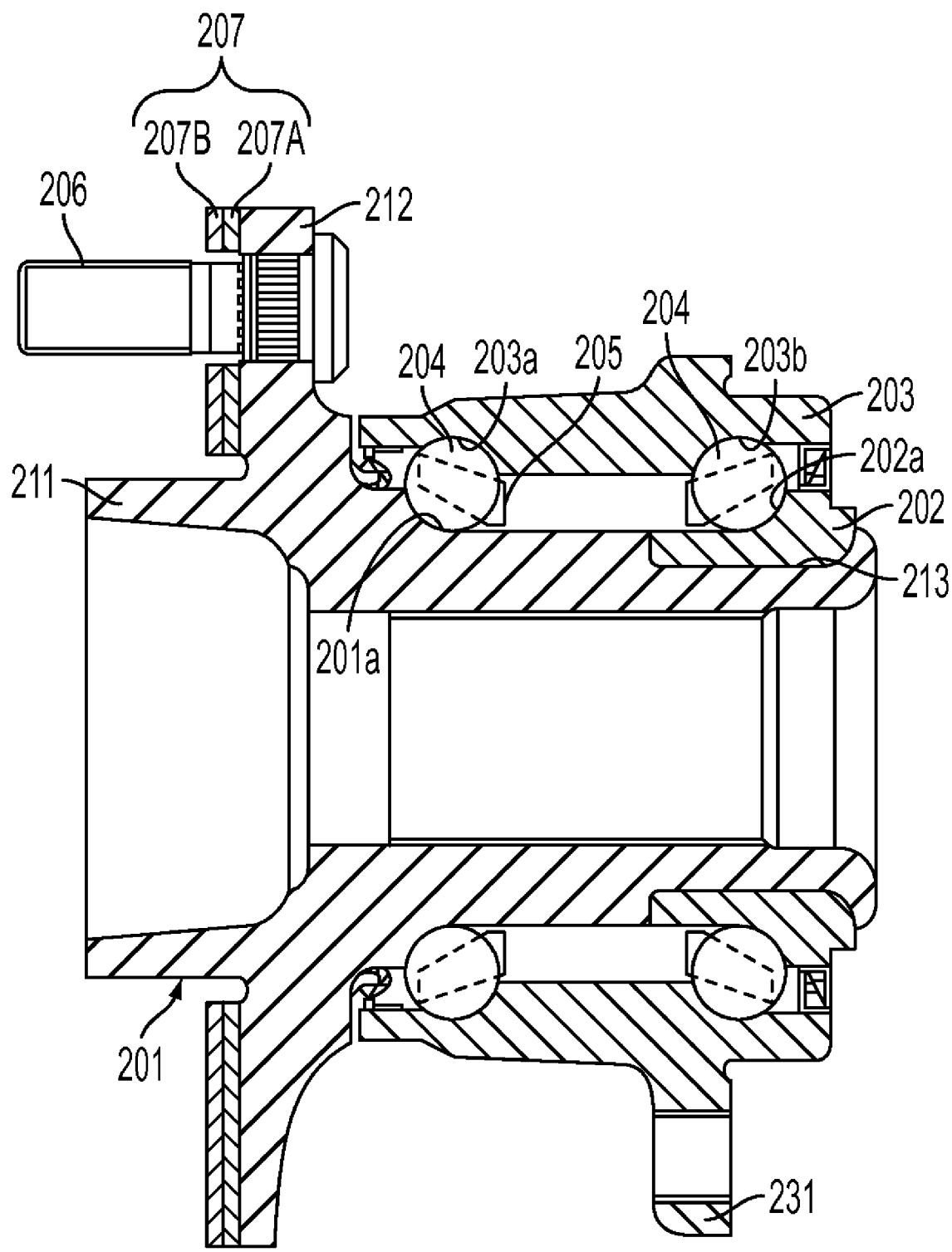
FIG. 4 is a cross-sectional view showing a fourth embodiment of the present invention.
Figure 5:
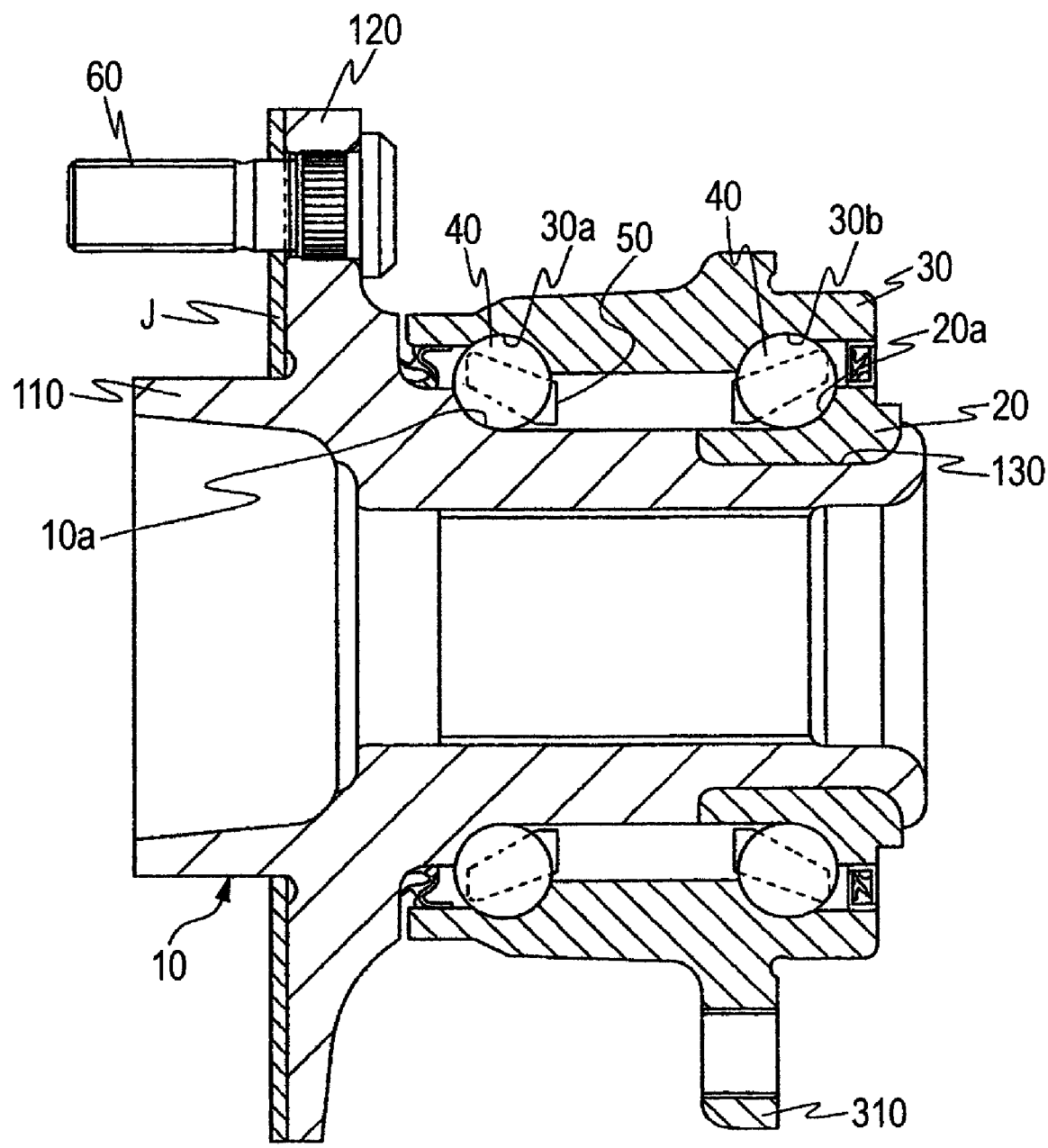
FIG. 5 is a cross-sectional view of a conventional example.

FIG. 4 is a cross-sectional view showing one example of a hub unit of the present invention.

As shown in FIG. 1, this hub unit comprises a hub ring 201 and an inner ring 202 which serve as a first member, an outer ring 203 serving as a second member, and balls 4 serving as rolling members.

A pilot portion 211 and a wheel-mounting flange 212 are provided at an outboard side (which is an outer end portion in a direction of a width of an automobile in a condition in which the hub unit is mounted on the automobile, and means a left end portion in FIG. 4) of the hub ring 201. This wheel-mounting flange 212 is provided on an outer peripheral surface of the hub ring 201, and a wheel and a brake rotor (which are not shown) are fixed to an axially outward side surface of this wheel-mounting flange through bolts 206.

On the other hand, a smaller-diameter step portion 213 is formed at an inboard side (which is an inner end portion in the direction of the width of the automobile in the condition in which the hub unit is mounted on the automobile, and means a right end portion in FIG. 4) of the hub ring 201. The inner ring 202 is fitted on this smaller-diameter step portion 213, and inner raceway surfaces 201a and 202a are formed on an outer peripheral surface of this inner ring 202 and an outer peripheral surface of an axially-intermediate portion of the hub ring 201, respectively. An inboard-side distal end portion of the hub ring 201 is formed into a cylindrical tubular shape, and by caulkingly spreading this cylindrical tubular portion radially outwardly, the inner ring 202, fitted on the smaller-diameter step portion 213 of the hub ring 201, is fixed in a predetermined position.

Outer raceway surfaces 203a and 203b, corresponding respectively to the inner raceway surfaces 201a and 202a formed respectively on the hub ring 201 and inner ring 202, are formed on an inner peripheral surface of the outer ring 203. A suspension-mounting flange 231 is provided at that end portion of the outer ring 203 remote from the wheel-mounting flange 212 of the hub ring 201.

The plurality of rolling members 204 are rollably mounted between each of the inner raceway surfaces 201a and 202a, formed respectively on the hub ring 201 and the inner ring 202, and a respective one of the plurality of rows of outer raceway surfaces 203a and 203b, formed on the outer ring 203, through a cage 205.

A plating layer 207 is formed on a side surface (axially-outward side surface) of the wheel-mounting flange 212 (formed on the outer peripheral surface of the hub ring 201) which is opposed to the brake rotor. This plating layer 207 has a double layer construction having a first plating layer (lowermost plating layer) 207A and a second plating layer (uppermost plating layer) 207B which are formed on the side surface of the wheel-mounting flange 212 in this order.

The first plating layer 207A is composed of a hard chrome-plating film formed by electroplating, and has hardness of Hv800, and has a film thickness of 10 μm.

The second plating layer 207B is composed of a tin-plating film formed by electroplating, and has hardness of HR30T50, and has a film thickness of 15 μm.

In the hub unit of this embodiment, the plating layer 207 of the double layer construction is formed on the side surface of the wheel-supporting flange 212 of the hub ring 201 (serving as the rotating member) opposed to the brake rotor, and therefore fretting and rust are made less liable to develop by the first plating layer 207A, and besides side run-out of the wheel-supporting flange 212 is suppressed by the second plating layer 207B. Therefore, in this hub unit, fretting and rust are less liable to develop on the side surface of the wheel-supporting flange 212 opposed to the brake rotor, and besides vibration is less liable to develop.

In this embodiment, although explanation has been made of the case where the plating layer 207 has the double layer construction, the present invention is not limited to it in so far as the advantages of the present invention can be achieved, and three or more plating layers can be formed.

In the hub unit of the present invention, the plating layer has the double layer construction having the first plating layer and the second plating layer which are formed at least on the axially-outward side surface of the flange in this order, and the first plating layer is composed of the hard plating film, and the second plating layer can be composed of the soft plating film.

The hard plating film, forming the lowermost plating layer (first plating layer), means a plating film having hardness of Hv (Vickers hardness) about 600 to about 1000. As specific examples of the hard plating film, a chrome plating film, a nickel-plating film and so on are given. Preferably, the thickness of the lowermost plating layer is 5 μm to 15 μm, and more preferably 10 μm.

The soft plating film, forming the uppermost plating layer (second plating layer), means a plating film having hardness of below about HR30T (Rockwell Superficial Hardness) 70. As specific examples of the soft plating film, a tin-plating film and so on are given. Preferably, the thickness of the uppermost plating layer is 10 μm to 20 μm, and more preferably 15 μm.

The plating layer of the present invention is formed after the flange is worked. The method of forming the plating layer is not particularly limited, and an electroplating method, a nonelectrolytic plating method, a vacuum plating method, a melt plating method and so on are given as examples. A person of ordinary skill in the art would understand that a plating layer would be monolithic with the surfaces of the flange on which the plating layer was formed. For maintaining the hardness of the substrate, it is particularly preferred to adopt the electroplating method. Also, for enhancing profile irregularity of the plating layer, machining such as grinding may be applied to the plating layer after this plating layer is formed.

The material, forming the constituent member of the wheel-supporting rolling bearing of the present invention, is not particularly limited in so far as it has hardness required for the constituent member of the hub unit, and also has good adhesion to the plating layer to be formed. Specific examples of the material for forming the constituent member include bearing steel such as SUJ2, case hardening steel such as SCR420 and stainless steel such as SUS440 which are subjected to a hardening and tempering process, or subjected to a carburizing or a carbonitriding process and a hardening and tempering process.

Note that the above-described hub unit can be used for a driving wheel and also driven wheel.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A hub unit comprising:
    a double-row outer ring comprising:
        a first inner peripheral raceway at a vehicle outer end-side portion; and
        a second inner peripheral raceway at a vehicle center-side portion;
    a hub comprising:
        a wheel-mounting flange provided at the vehicle outer end-side portion, the wheel-mounting flange being provided with a reference surface for mounting a wheel formed on a vehicle outer end-side thereof;
        a first outer peripheral raceway formed integrally with or separately from the hub at a vehicle center-side of the flange, the first outer peripheral raceway being opposed to the first inner peripheral raceway of the outer ring;
        a shaft body comprising a distal end fitting portion at the vehicle center-side thereof; and
        an inner ring element which is fitted on and fixed to the distal end fitting portion, and comprises a second outer peripheral raceway opposed to the second inner peripheral raceway of the outer ring;
    rolling members interposed between the double-row inner peripheral raceway of the outer ring and the double-row outer peripheral raceway of the hub so as to allow a relative rotation between the outer ring and the hub; and
    cages holding the rolling members,
    wherein a plane of the wheel-mounting reference surface of the flange only extends substantially perpendicular to a rotational center of the hub,
    wherein first and second rust-preventive layers are provided only on an axially-outward side surface of the plane, in this order,
    wherein the first and second rust-preventive layers are monolithic with the wheel-mounting reference surface of the flange and at least one of a grinding and turning is performed on the second rust preventive layers,
    wherein the first and second rust-preventive layers are electroplating layers,
    wherein the hardness of the first rust preventive layer is higher than the hardness of the second rust preventive layer,
    wherein the thickness of the first layer is between 5 μm and 15 μm, and
    wherein the first layer is a chrome plating layer or a nickel plating layer.

2. The hub unit according to claim 1, wherein bolt holes for mounting the wheel are provided on the wheel-mounting reference surface of the flange.

3. The hub unit according to claim 1, wherein
    the thickness of the second layer is between 10 μm and 20 μm and
    the second layer is a tin plating layer.

4. The hub unit according to claim 3, wherein the second rust-preventive layer has a HR30T (Rockwell Superficial Hardness) of less than 70.

5. The hub unit according to claim 1, wherein the second rust-preventive layer has a HR30T (Rockwell Superficial Hardness) of less than 70.

* * * * *